(12) United States Patent
Kim et al.

(10) Patent No.: US 11,790,840 B2
(45) Date of Patent: Oct. 17, 2023

(54) TILING DISPLAY APPARATUS

(71) Applicant: LG Display Co., Ltd., Seoul (KR)

(72) Inventors: Tae Gung Kim, Paju-si (KR); Dae Sung Park, Paju-si (KR); Chang Woo Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/984,928

(22) Filed: Nov. 10, 2022

(65) Prior Publication Data

US 2023/0215345 A1 Jul. 6, 2023

(30) Foreign Application Priority Data

Dec. 31, 2021 (KR) .......................... 10-2021-0194727

(51) Int. Cl.
  *G09G 3/32* (2016.01)
(52) U.S. Cl.
  CPC .......... *G09G 3/32* (2013.01); *G09G 2300/026* (2013.01); *G09G 2310/08* (2013.01)
(58) Field of Classification Search
  CPC . G09G 2310/08; G09G 2300/026; G09G 3/32
  See application file for complete search history.

(56) References Cited

U.S. PATENT DOCUMENTS

| 11,036,455 | B2* | 6/2021 | Kim | G06F 3/1446 |
| 2007/0035485 | A1* | 2/2007 | Yoon | G09G 3/3208 345/76 |
| 2009/0096711 | A1* | 4/2009 | Jang | G06F 3/1446 345/1.3 |
| 2016/0133216 | A1* | 5/2016 | Song | G09G 3/3677 345/87 |
| 2017/0061930 | A1* | 3/2017 | Iuchi | G06F 3/0445 |

\* cited by examiner

*Primary Examiner* — Muhammad N Edun
(74) *Attorney, Agent, or Firm* — Seed IP Law Group LLP

(57) ABSTRACT

A tiling display apparatus includes a plurality of display modules connected to one another to configure a screen, a set board configured to output an input data enable signal and image data synchronized therewith to one of the plurality of display modules, and first to $N^{th}$ (where N is a natural number of 3 or more) timing controllers configured for the plurality of display modules, the first to $N^{th}$ timing controllers are sequentially connected to one another in a first direction through a first interface line based on a cascading scheme and configured to receive the input data enable signal and the image data at different timings which are sequentially delayed and synchronize a display time of the image data on the basis of an independently generated output data enable signal.

17 Claims, 12 Drawing Sheets

TILING DISPLAY APPARATUS

CROSS-REFERENCE TO RELATED APPLICATIONS

This application claims the benefit of and priority to Korean Patent Application No. 10-2021-0194727, filed on Dec. 31, 2021, which is herein incorporated by reference in its entirety.

BACKGROUND

Technical Field

The present disclosure relates to a tiling display apparatus capable of expanding.

Description of the Related Art

Large-sized displays may be used in various fields such as indoor and outdoor digital advertisements. In order to satisfy the demands for large-sized displays, tiling display apparatuses capable of being expanded have been proposed. In tiling display apparatuses, a single screen is configured by connecting a plurality of display modules, and a desired screen size may be implemented by adjusting the number of display modules connected to one another.

BRIEF SUMMARY

In tiling display apparatuses, because display modules sequentially receive image data on the basis of a cascading scheme, a time for receiving image data may be progressively delayed in the display modules. Due to an image data input deviation between the display modules, a deviation of an image output may occur.

Various output synchronization technologies for correcting an image output deviation between display modules may be used. However, some output synchronization technologies may not be applied to a tiling display apparatus where an interfacing length between display modules is not standardized.

To overcome the aforementioned problem, the present disclosure may provide a tiling display apparatus which may automatically match image output times of all display modules regardless of a standardization or non-standardization connection structure between the display modules.

To achieve these technical benefits and other advantages and in accordance with the purpose of the disclosure, as embodied and broadly described herein, a tiling display apparatus includes a plurality of display modules connected to one another to configure a screen, a set board configured to output an input data enable signal and image data synchronized therewith to one of the plurality of display modules, and first to $N^{th}$ (where N is a natural number of 3 or more) timing controllers configured for the plurality of display modules, the first to $N^{th}$ timing controllers are sequentially connected to one another in a first direction through a first interface line based on a cascading scheme and configured to receive the input data enable signal and the image data at different timings which are sequentially delayed and synchronize a display time of the image data on the basis of an independently generated output data enable signal.

By using a current-stage input data enable signal received from an adjacent front-stage timing controller through the first interface line and a rear-stage input data enable signal fed back from an adjacent rear-stage timing controller through a second interface line which differs from the first interface line, at least one of the first to $N^{th}$ timing controllers independently calculates an adjacent delay amount between itself and the rear-stage timing controller so as to generate the output data enable signal.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
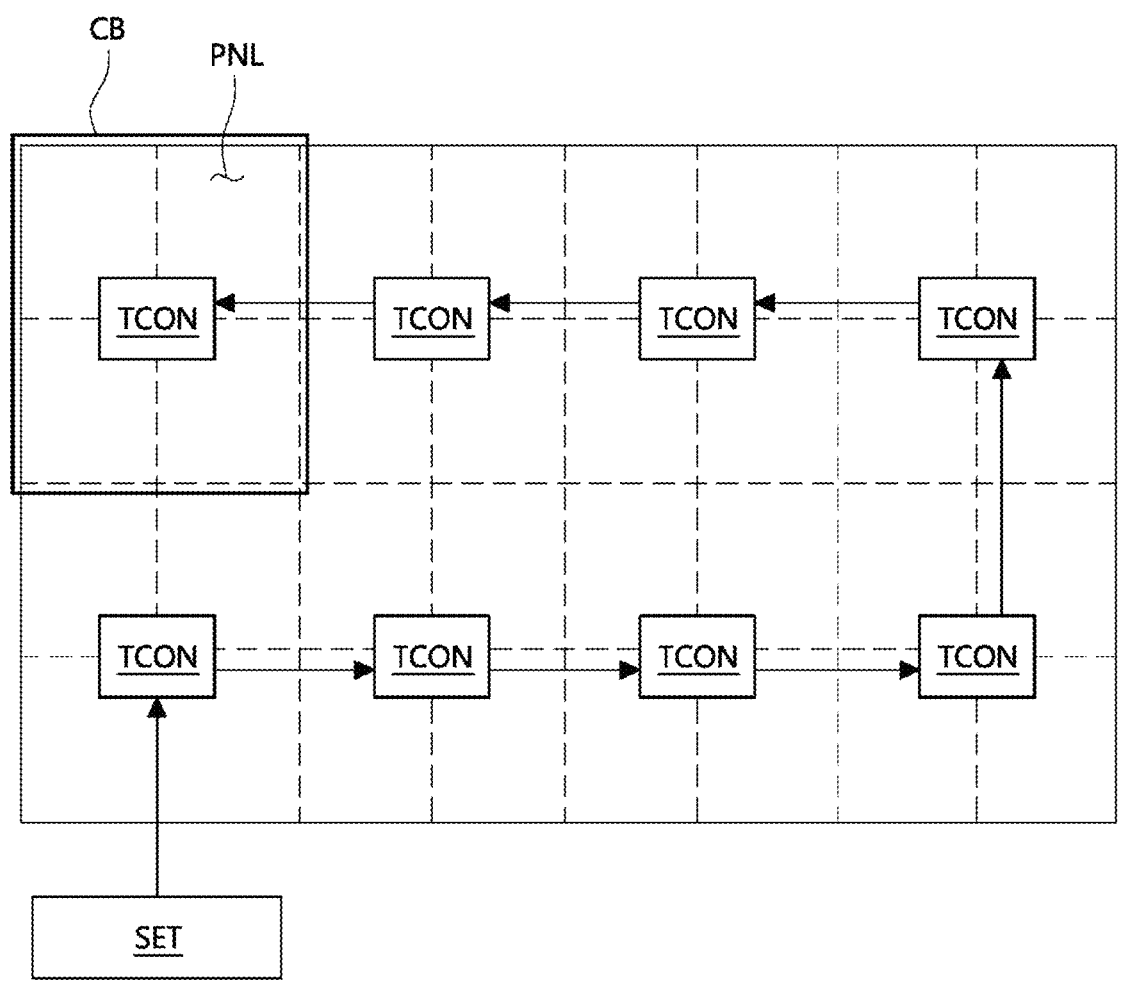
FIG. 1 is a diagram schematically illustrating a tiling display apparatus according to an embodiment of the present disclosure.

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure are merely examples and the present disclosure is not limited thereto. Like reference numerals refer to like elements throughout the specification. Throughout this specification, the same elements are denoted by the same reference numerals. As used herein, the terms "comprise," "having" "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," and "next~," one or more other parts may be disposed between the two parts unless "just" or "direct" is used.

It will be understood that, although the terms "first," "second," etc., may be used herein to describe various elements, these elements should not be limited by these terms. These terms are only used to distinguish one element from another element. For example, a first element could be termed a second element, and, similarly, a second element could be termed a first element, without departing from the scope of the present disclosure.

Hereinafter, embodiments of the present disclosure will be described in detail with reference to the accompanying drawings.

Figure 2:
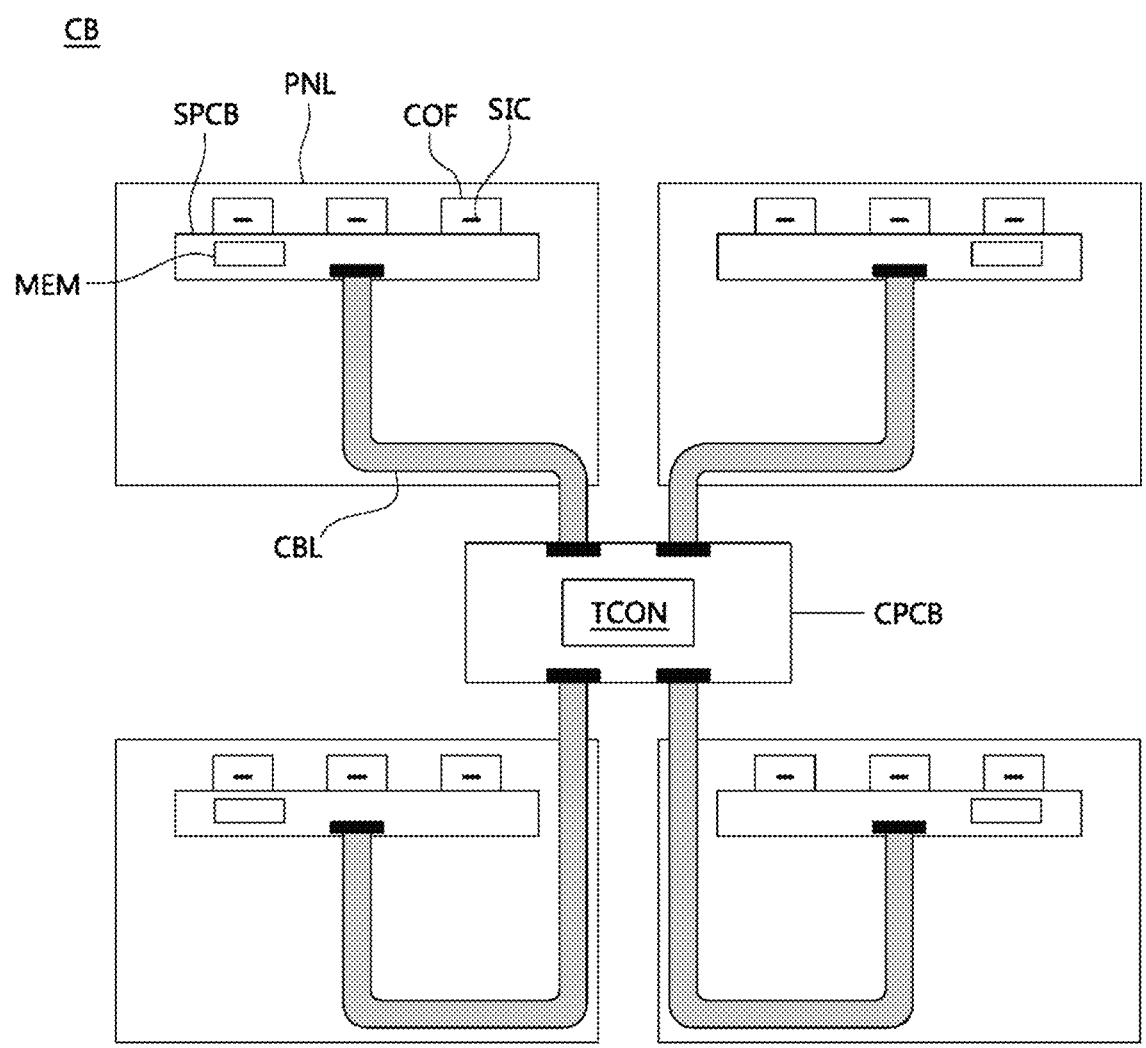
FIG. 2 is a diagram illustrating a connection configuration of a display module.

FIG. 1 is a diagram schematically illustrating a tiling display apparatus 100 according to an embodiment of the present disclosure. FIG. 2 is a diagram illustrating a connection configuration of a display module.

Referring to FIGS. 1 and 2, the tiling display apparatus 100 according to an embodiment of the present disclosure may include a set board SET and a plurality of display modules CB. Each of the plurality of display modules CB may be referred to as a cabinet.

The plurality of display modules CB may be connected to one another through a serial interface circuit to configure a large screen. A total resolution of the large screen may be determined as a total sum of unit resolutions of each display module CB. For example, in a case where a screen is configured by eight display modules having a unit resolution of 960*1080, a total resolution of the screen may be 3840*2160.

The set board SET may transfer image data, which is configured for implementing an input image, to one of the plurality of display modules CB through a serial interface circuit. The serial interface circuit may be implemented based on a V-by-One (Vx1) scheme capable of high-speed and large-capacity interfacing, but is not limited thereto.

Each display module CB may include a plurality of display panels PNL, a plurality of panel driving circuits for driving the plurality of display panels PNL, and a timing controller TCON which controls operation timings of the panel driving circuits.

Each of the plurality of display panels PNL may be implemented as an electroluminescent light emitting display apparatus based on a micro light emitting diode (LED), but is not limited thereto and may be implemented as an electroluminescent light emitting display apparatus based on an organic or inorganic LED.

A plurality of timing controllers TCON configured for the plurality of display module CB may be connected to one another through a serial interface circuit such as V-by-One (Vx1). The plurality of timing controllers TCON may be sequentially connected to one another by a cascading scheme and may receive an input data enable signal and image data synchronized therewith at different timings (sequentially delayed timings). Comparing with the related art, the timing controllers TCON may use new output synchronization technology for matching a display time (i.e., an image output time) of image data.

Output synchronization technology according to the present embodiment may synchronize image output times of all display modules CB on the basis of an output data enable signal independently generated by each of the plurality of timing controllers TCON. In the output synchronization technology according to the present embodiment, each timing controller TCON may independently calculate an adjacent delay amount corresponding to an adjacent rear-stage timing controller so as to generate a synchronized output data enable signal. Accordingly, regardless of a formal or non-formal tiling connection structure between the plurality of display modules CB, image output times of all display modules CB may be automatically matched.

The timing controller TCON of each display module CB may be mounted on a control printed circuit board CPCB and may be connected to panel driving circuits of a corresponding display module CB through a branch cable CBL in parallel.

The panel driving circuit may be independently included in each of the plurality of display panels PNL configuring the same display module CB. The panel driving circuit may include a source printed circuit board SPCB connected to the timing controller TCON through the cable CBL, a memory circuit MEM mounted on the source printed circuit board SPCB, a conductive film COF electrically connecting the source printed circuit board SPCB to the display panel PNL, a data driver SIC bonded to the conductive film COF, and a gate driver and a power circuit electrically connected to the source printed circuit board SPCB.

The memory circuit MEM may be a non-volatile memory which stores panel characteristic information and may be flash memory and/or electrically erasable programmable read-only memory (EEPROM). The panel characteristic information may include a correction value for gamma setting, a first compensation value for compensating for a driving characteristic deviation/color deviation between pixels, a second compensation value for compensating for a boundary deviation between adjacent display panels PNL, various image qualities, and driving control data. In the panel characteristic information, a high amount of data may be stored in flash memory, and a low amount of data may be stored in EEPROM.

The timing controller TCON may operate the panel driving circuit on the basis of a control command signal received through a control interface circuit such as a serial peripheral interface (SPI) to execute a target operation corresponding to the control command signal, and thus, may generate a control response signal including an execution result of the target operation. The target operation may include reset, mute (dark change), average picture level (APL) range change, gamma change, image quality compensation value update, and firmware update. The target operation may further include an operation of writing and storing control command data in a specific memory and an operation of reading the control execution data from the specific memory.

Figure 3:
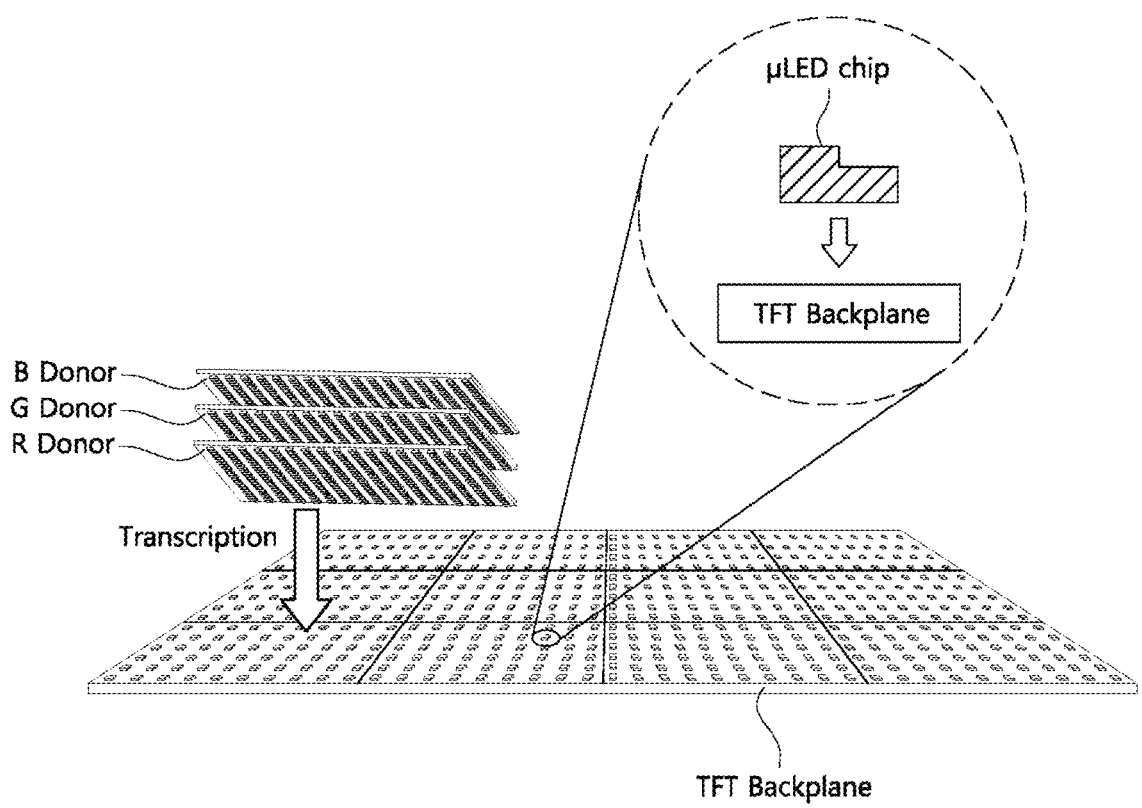
FIGS. 3 and 4 are diagrams illustrating a display panel based on a micro light emitting diode (LED)
Figure 4:
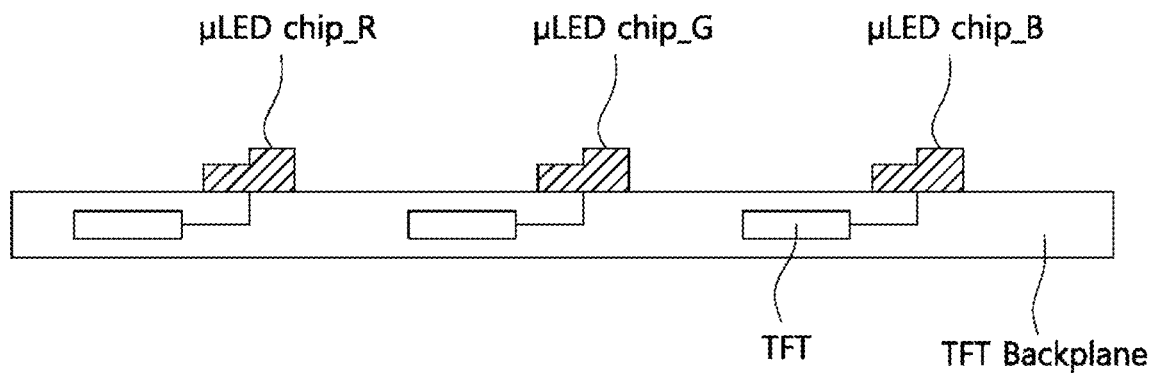
Figure 5:
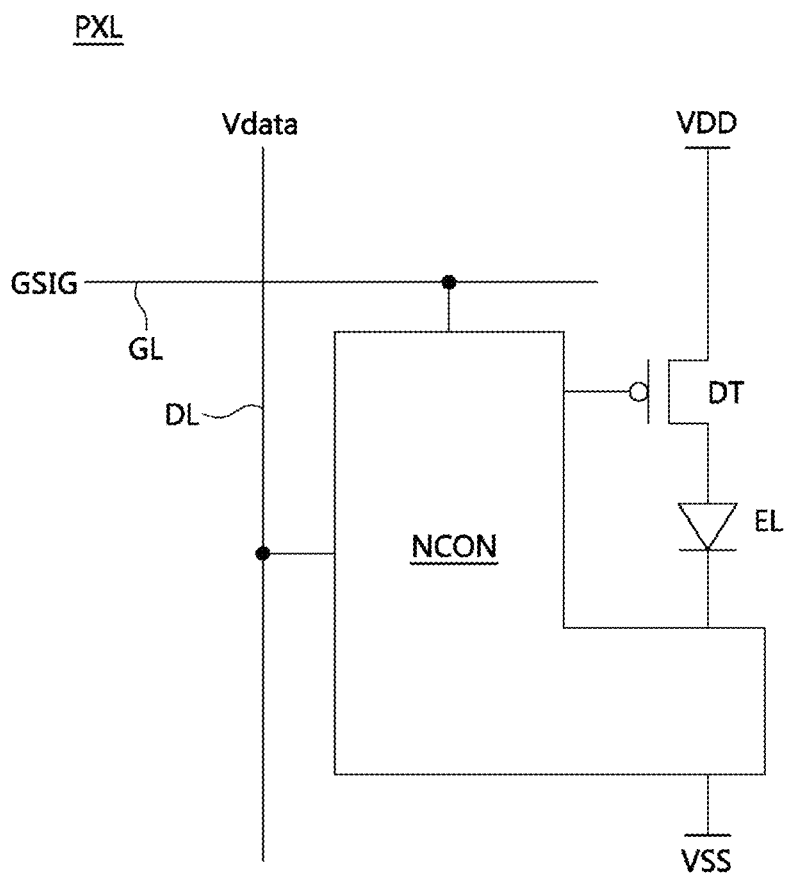
FIG. 5 is a schematic equivalent circuit diagram of a pixel included in a display panel.

FIGS. 3 and 4 are diagrams illustrating a display panel based on a micro-LED. FIG. 5 is a schematic equivalent circuit diagram of a pixel included in a display panel.

Referring to FIGS. 3 and 4, a pixel array for reproducing an input image may be provided in each of the display panels PNL. A plurality of pixels may be arranged in the pixel array, and signal lines for driving the pixels may be arranged in the pixel array. The signal lines may include a plurality of data lines DL for supplying data voltages Vdata to the pixels, a plurality of gate lines GL for supplying a gate signal GSIG to the pixels, and a plurality of power lines for supplying a source voltage to the pixels.

Each of the plurality of pixels may include a micro-LED chip μLED chip) as a light emitting device EL. A plurality of micro-LED chips (μLED chip) may include red chips (μLED chip_R), green chips (μLED chip_G), and blue chips (μLED chip_B), which are disposed on a thin film transistor (TFT) backplane. A red (R) pixel may include a red chip (μLED chip_R) as a light emitting device EL, a green (G) pixel may include a green chip μLED chip_G) as a light emitting device EL, and a blue (B) pixel may include a blue chip μLED chip_B) as a light emitting device EL.

The micro-LED chips (μLED chip) may be transferred from R/G/B donors, and thus, may be mounted on a TFT backplane. The red chips (μLED chip_R) may be transferred from an R donor, the green chips (μLED chip_G) may be transferred from a G donor, and the blue chips (μLED chip_B) may be transferred from a B donor. Transfer technology may use an electrostatic force, a laser, a speed-dependent tacky force, and a load-dependent tacky force. The transfer technology is not limited thereto and may use self-assembly based on an electrostatic force.

The TFT backplane may be implemented in an active matrix structure for efficient driving. In the TFT backplane, the pixels may be defined by the data lines DL, the gate lines GL, and the power lines.

A plurality of pixels may configure one unit pixel. For example, R, G, and B pixels arranged adjacent thereto may configure one unit pixel in an extension direction of the gate line GL or an extension direction of the data line DL.

As shown in FIG. 5, a pixel PXL may include a light emitting device EL, a driving TFT DT, and a node circuit NCON.

The node circuit NCON may be connected to the gate line GL and the data line DL. The node circuit NCON may be supplied with the data voltage Vdata through the data line DL and may be supplied with the gate signal GSIG through the gate line GL. The node circuit NCON may apply the data voltage Vdata to a gate electrode of the driving TFT DT in synchronization with the gate signal GSIG, and thus, may set a gate-source voltage of the driving TFT DT on the basis of a condition for generating a driving current. The node circuit NCON may include an internal compensation circuit which senses and compensates for a threshold voltage and/or electron mobility of the driving TFT DT.

The driving TFT DT may be a driving element which generates the driving current on the basis of the gate-source voltage thereof. The gate electrode of the driving TFT DT may be connected to the node circuit NCON, a first electrode (a drain electrode) thereof may be connected to a high level pixel power VDD, and a second electrode (a source electrode) thereof may be connected to a light emitting device EL.

The light emitting device EL may be a light emitting device which emits light having an intensity corresponding to the driving current input to the driving TFT DT. The light emitting device EL may be implemented with a micro-LED including an inorganic light emitting layer. A first electrode of the light emitting device EL may be connected to the driving TFT DT, and a second electrode thereof may be connected to a low level pixel power VSS.

A connection configuration and an operation of one pixel PXL may be merely an embodiment, and the spirit of the present disclosure is not limited thereto. For example, each of the driving TFT DT and the node circuit NCON may be implemented based on a PMOS transistor, or may be implemented based on an NMOS transistor. Also, the gate line GL connected to the node circuit NCON may be provided in plurality.

Figure 6:
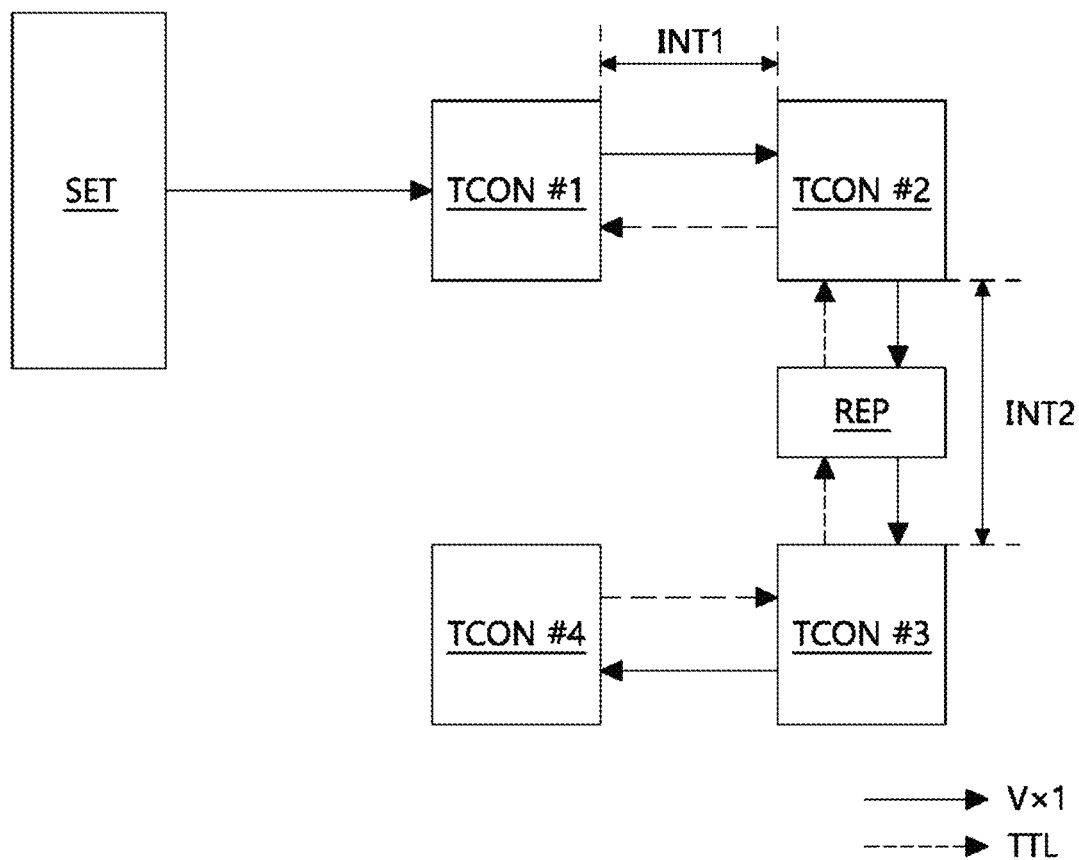
FIG. 6 is a diagram illustrating an example of a non-formal connection structure between display modules.
Figure 7:
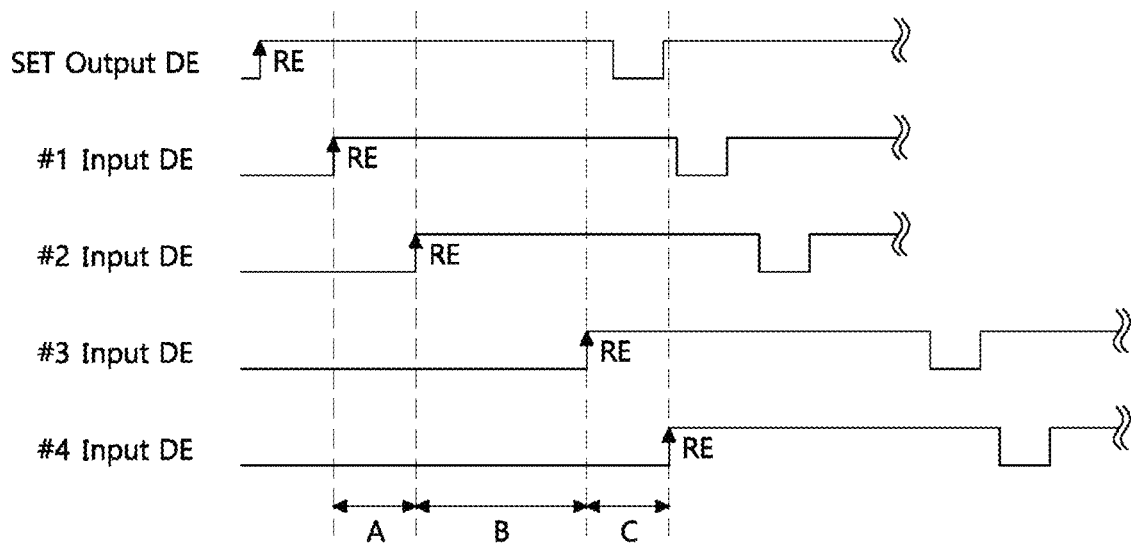
FIG. 7 is a diagram illustrating input data enable signals received by timing controllers of FIG. 6 at different timings which are sequentially delayed in a first direction.

FIG. 6 is a diagram illustrating an example of a non-formal connection structure between display modules. FIG. 7 is a diagram illustrating input data enable signals received by timing controllers of FIG. 6 at different timings which are sequentially delayed in a first direction.

Referring to FIGS. 6 and 7, a first timing controller TCON #1, a second timing controller TCON #2, a third timing controller TCON #3, and a fourth timing controller TCON #4 may be sequentially connected to one another, and a set board SET may be connected to the first timing controller TCON #1. A connection type between the set board SET and display modules may be differently implemented based on a type of the set board and/or a method of manufacturing a tiling system, and thus, the number and positions of timing controllers TCON #1 to TCON #4 may be changed. The timing controllers TCON #1 to TCON #4 may be connected to one another through a first interface line such as Vx1, and in this case, a vertical connection length INT2 between specific timing controllers TCON #2 and TCON #3 may be longer than a horizontal connection length INT1 between specific timing controllers TCON #1 and TCON #2 and specific timing controllers TCON #3 and TCON #4.

A data enable signal DE may be sequentially delayed in synchronization with image data and may be transferred to the first to fourth timing controllers TCON #1 to TCON #4. The set board SET may transfer the image data to the first timing controller TCON #1 in synchronization with a rising edge RE of a set output data enable signal (SET Output DE), but is not limited thereto. The first to fourth timing controllers TCON #1 to TCON #4 may receive the image data in synchronization with rising edges RE of first to fourth input data enable signals (#1-#4 Input DE) which are sequentially delayed and input thereto, but are not limited thereto. A synchronization scheme between the data enable signal DE and the image data may be variously modified.

Each of the first to fourth timing controllers TCON #1 to TCON #4 may decode an input data enable signal and image data, received through a first interface line, through a clock and data recovery (CDR) process and may perform compensation processing on the decoded image data by using an image quality compensation algorithm. Each of the first to fourth timing controllers TCON #1 to TCON #4 may encode the decoded image data and the input data enable signal DE and may transfer the encoded image data and the input data enable signal DE to a rear-stage timing controller through the first interface line. The image data and the input data enable signal DE may be delayed in the CDR process and the input/output process.

Furthermore, when a first interface line between adjacent timing controllers is greater than a rated allowable value, interfacing efficiency may be reduced, and thus, a repeater REP may be added between specific timing controllers (for example, the second timing controller TCON #2 and the third timing controller TCON #3) where the connection length INT2 is long. The repeater REP may perform a CDR operation to re-transfer image data, and thus, the delay of the input data enable signal DE and the image data between the second timing controller TCON #2 and the third timing controller TCON #3 may occur with a relatively high possibility.

For example, as shown in FIG. 7, when an adjacent delay amount between the first and second timing controllers TCON #1 and TCON #2 is "A" and an adjacent delay amount between the third and fourth timing controllers TCON #3 and TCON #4 is "C," an adjacent delay amount between the second and third timing controllers TCON #2 and TCON #3 further including an additional delay caused by the repeater REP may be "B." "B" may be greater than each of "A" and "C." "A" and "C" may be the same or differ from each other.

Because the first to fourth timing controllers TCON #1 to TCON #4 receive the image data and the input data enable signal DE at different timings, a synchronized output data enable signal for enabling the image data to be simultaneously applied to all display panels included in display modules may be needed.

In order to generate a synchronized output data enable signal, a register scheme, feedback wire technology, and synchronization wire technology may be considered.

According to the register scheme, a fixed delay value for each timing controller may be previously stored in a register on the basis of a transfer order, and each timing controller may generate the output data enable signal on the basis of the fixed delay value. According to the feedback wire technology, a first timing controller and a last timing controller based on a data interfacing order may be connected to each other through a feedback wire, and the first timing controller may equally distribute a total delay, obtained through the feedback wire, to each timing controller to adjust a generating time of the output data enable signal. In the synchronization wire technology, a set board may adjust the generating time of the output data enable signal with respect to the last timing controller by using a synchronization wire connected to all timing controllers in common.

The synchronization wire technology may be re-designed whenever the number of connections of tiled timing controllers is changed, and due to this, may be considerably low in expandability. Because the number of connections of timing controllers may be applicable only when a delay consumed for each timing controller is previously known, the register scheme may not be applied to an expandable and modifiable non-formal tiling connection structure based on various user needs. In some cases, the register scheme may be applied to only a formal tiling connection structure where the number of connections of tiled timing controllers and a delay consumed for each timing controller are equal.

Likewise, the feedback wire technology may not be applied to a non-formal tiling connection structure where a delay consumed in at least some timing controllers differs from a delay consumed in the other timing controllers. In the non-formal tiling connection structure, an input and output delay amount may differ for each tiled timing controller, and as shown in FIG. 6, a data interfacing length between some timing controllers may be relatively longer. Accordingly, when the feedback wire technology for equally distributing a total delay on the basis of the number of connections of timing controllers is applied to the non-formal tiling connection structure, it may be difficult to correct an image output deviation between timing controllers.

Hereinafter, the output synchronization technology according to the present embodiment described below may be a technology where each timing controller independently calculates a delay deviation between a corresponding timing controller and a last timing controller through a delay feedback operation performed between adjacent timing controllers, and based thereon, an output data enable signal is synchronized.

In the output synchronization technology according to the present embodiment, regardless of the formal/non-formal tiling connection structure, each timing controller may automatically synchronize an image output time for all display modules, and thus, the image quality of a tiling display apparatus may be improved.

Because each timing controller automatically synchronizes an image output time for all display modules, the output synchronization technology according to the present embodiment may be applied to an expandable and modifiable non-formal tiling connection structure based on various user needs, and thus, the convenience of users may be increased.

Figure 8:
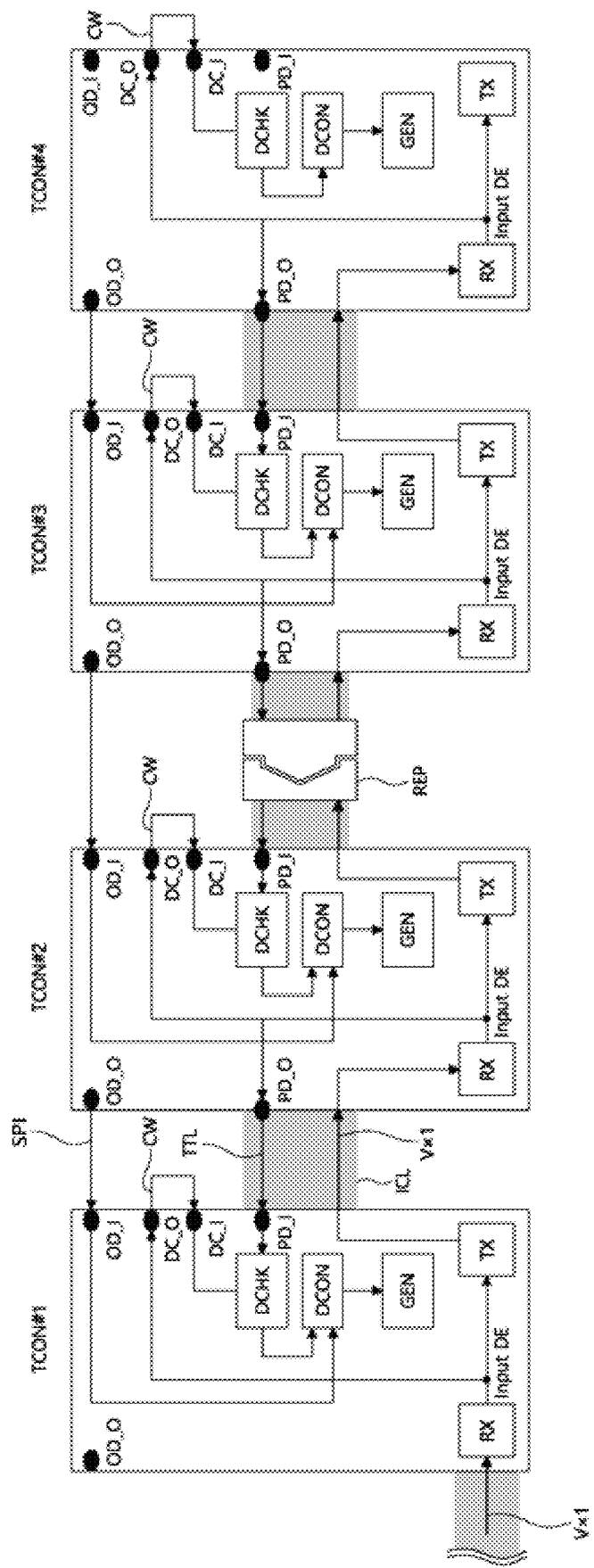
FIG. 8 is a diagram illustrating a connection configuration of the timing controllers of FIG. 6 for independently calculating an adjacent delay amount between adjacent timing controllers.
Figure 9:
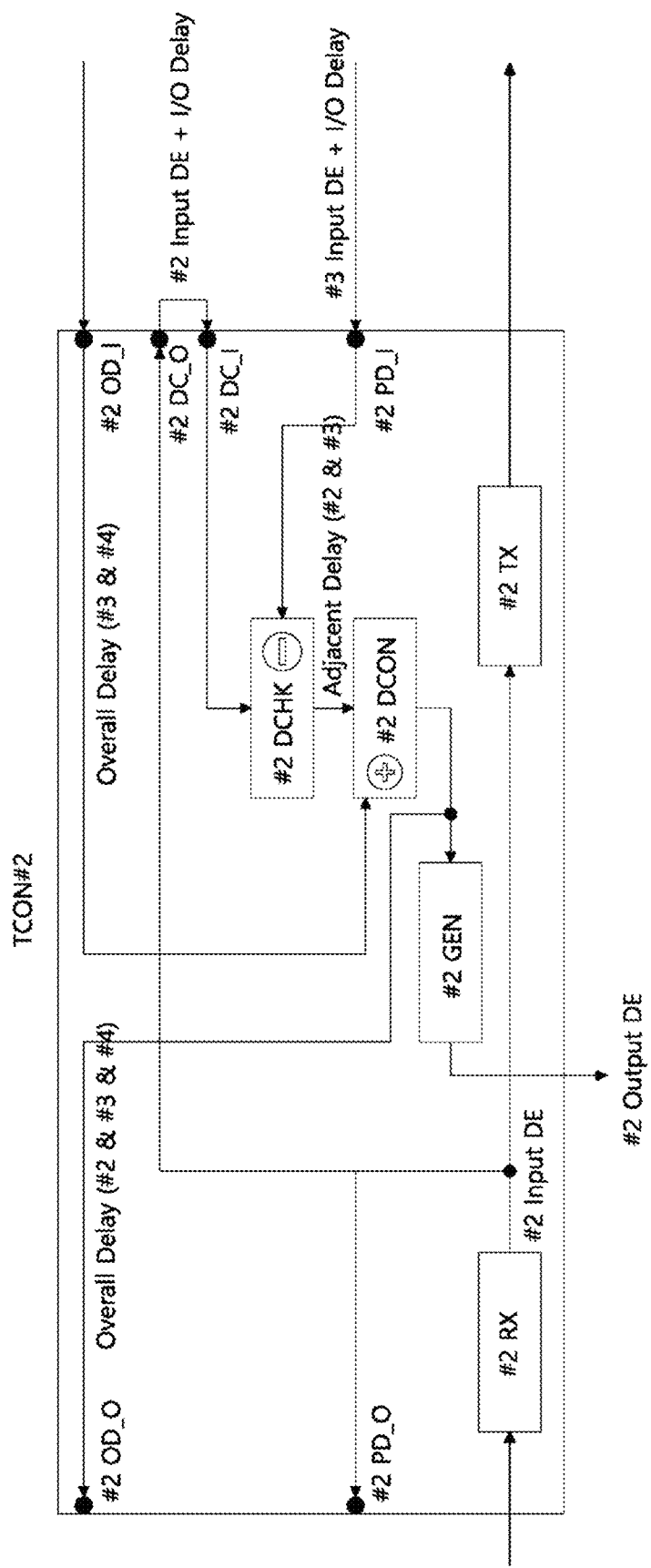
FIG. 9 is a diagram illustrating in detail an internal connection configuration of some timing controllers illustrated in FIG. 8.
Figure 10:
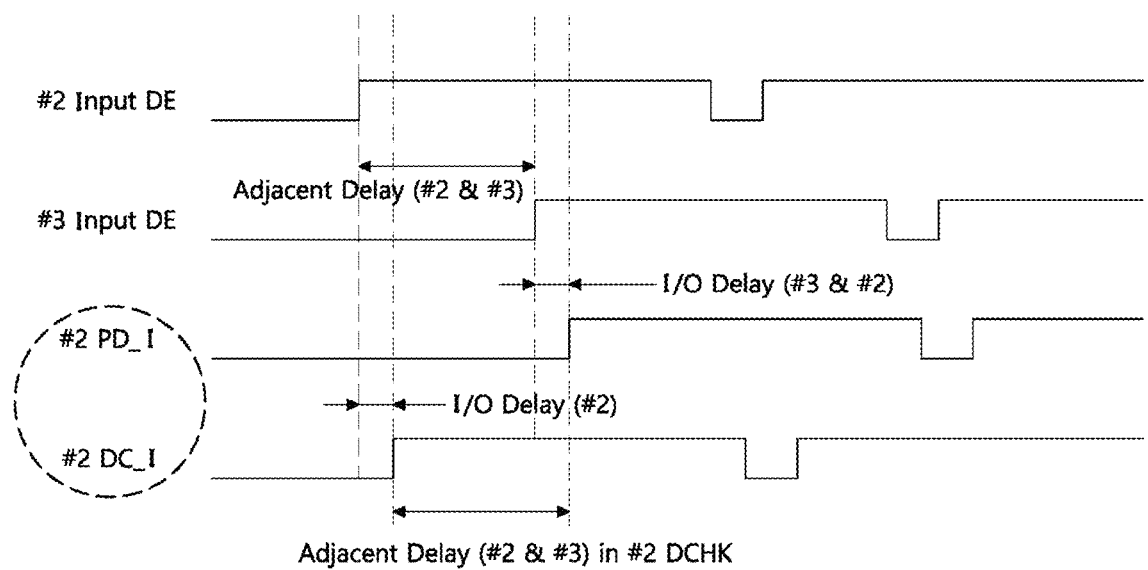
FIG. 10 is a waveform diagram for describing operations of some timing controllers illustrated in FIG. 9.
Figure 11:
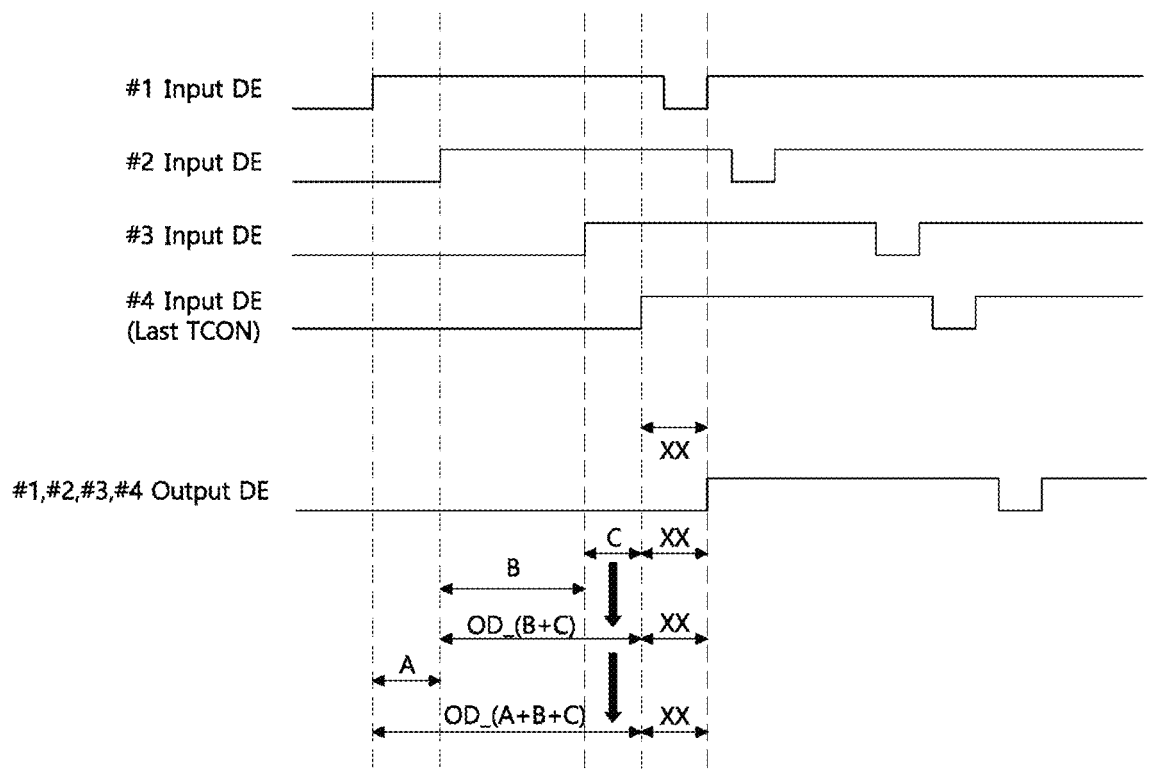
FIG. 11 is a diagram illustrating an example where output data enable signals are simultaneously generated by some timing controllers illustrated in FIG. 8.

FIG. 8 is a diagram illustrating a connection configuration of the timing controllers of FIG. 6 for independently calculating an adjacent delay amount between adjacent timing controllers. FIG. 9 is a diagram illustrating in detail an internal connection configuration of some timing controllers illustrated in FIG. 8. FIG. 10 is a waveform diagram for describing operations of some timing controllers illustrated in FIG. 9. FIG. 11 is a diagram illustrating an example where output data enable signals are simultaneously generated by some timing controllers illustrated in FIG. 8.

Referring to FIGS. 8 to 11, first to fourth timing controllers TCON #1 to TCON #4 may be sequentially connected to one another in a first direction through a first interface line Vx1 based on the cascading scheme and may receive an input data enable signal (#1-#4 Input DE) and image data at different timings which are sequentially delayed. Here, the first direction may be a direction in which data interfacing is transferred and may not denote one specific direction. The first direction may include one or more directions of four directions (for example, up, down, left, and right directions) on the basis of the first to fourth timing controllers TCON #1 to TCON #4 for implementing a tiling connection structure.

Each of the second to fourth timing controllers TCON #2 to TCON #4 may receive an input data enable signal (#2-#4 Input DE) and image data through the first interface line Vx1 from front-stage timing controllers TCON #1 to TCON #3 adjacent thereto in a second direction. The second direction may be a direction in which feedback interfacing is transferred and may be opposite to the first direction. The second direction may include one or more directions of four directions (for example, up, down, left, and right directions) on the basis of the first to fourth timing controllers TCON #1 to TCON #4 for implementing a tiling connection structure.

Each of the first to third timing controllers TCON #1 to TCON #3 may receive, through feedback, an input data enable signal of a rear stage from rear-stage timing controllers TCON #2 to TCON #4 adjacent thereto in the first direction and may independently calculate an adjacent delay amount corresponding to the rear-stage timing controllers TCON #2 to TCON #4.

Each of the first to third timing controllers TCON #1 to TCON #3 may receive, through feedback, an input data enable signal (#2-#4 Input DE) of a rear stage from rear-stage timing controllers TCON #2 to TCON #4 adjacent thereto in the first direction through a second interface line TTL which differs from the first interface line Vx1.

The first timing controller TCON #1 may be illustrated as a first timing controller for data interfacing, and the fourth timing controller TCON #4 may be illustrated as a last timing controller for data interfacing.

Because the first timing controller TCON #1 is the first timing controller for data interfacing, only delay input pins OD_I and PD_I may be used for a delay feedback operation. Because the fourth timing controller TCON #4 is the last timing controller for data interfacing, only delay output pins OD_O and PD_O may be used for the delay feedback operation. In the first to fourth timing controllers TCON #1 to TCON #4, "DC_I" and "DC_O" may be I/O correction input/output pins for correcting an input and output delay amount (I/O delay), instead of the delay feedback operation.

Each of the second and third timing controllers TCON #2 and TCON #3 may use all of the delay input pins OD_I and PD_I and the delay output pins OD_O and PD_O, for the delay feedback operation.

The delay input pins OD_I and PD_I may include an adjacent delay input pin PD_I and an overall delay input pin OD_I, and the delay output pins OD_O and PD_O may include an adjacent delay output pin PD_O and an overall delay output pin OD_O.

The adjacent delay output pin PD_O and the adjacent delay input pin PD_I may be calculated to calculate an adjacent delay amount between adjacent timing controllers. The adjacent delay output pin PD_O and the adjacent delay input pin PD_I may be connected to each other between adjacent timing controllers through the second interface line TTL.

The overall delay input pin OD_I may be used to receive a rear-stage overall delay amount, generated by a rear-stage timing controller, from the rear-stage timing controller through feedback. The rear-stage overall delay amount may denote an overall delay amount between the rear-stage timing controller and the last timing controller TCON #4. The overall delay output pin OD_O may be used to feed back a current-stage overall delay amount, generated by a current-stage timing controller, to the front-stage timing controller. The current-stage overall delay amount may be a result obtained by summating a current-stage adjacent delay amount and a rear-stage overall delay amount and may denote an overall delay amount between the current-stage timing controller and the last timing controller TCON #4.

In the present embodiment, first to third interface lines Vx1, TTL, and SPI may be included in the same transmission cable ICL and may be connected between adjacent timing controllers, but the present embodiment is not limited thereto. As shown in FIG. 8, only the first and second interface lines Vx1 and TTL may be included in the same transmission cable ICL, and the third interface line SPI may be included in a separate transmission cable.

To describe the second timing controller TCON #2 for example, a configuration and an operation of a timing controller for implementing data interfacing, feedback interfacing, and output synchronization will be described below.

The second timing controller TCON #2 may receive an input data enable signal #2 Input DE and image data synchronized therewith through the first interface line Vx1 from the first timing controller TCON #1 adjacent thereto in the second direction and may receive rear-stage input data enable signal #3 Input DE fed back through the second interface line TTL from the third timing controller TCON #3. The rear-stage input data enable signal #3 Input DE may be an input data enable signal received from the third timing controller TCON #3.

The second timing controller TCON #2 may include an adjacent delay input pin #2 PD_I, a Vx1 receiver #2 RX, a Vx1 transmitter #2 TX, and an adjacent delay calculator #2 DCHK. The adjacent delay input pin #2 PD_I may be configured for receiving a rear-stage input data enable signal #3 Input DE which is received from the third timing controller TCON #3 and is fed back from an adjacent delay output pin #3 PD_O of the third timing controller TCON #3. An adjacent delay input pin #2 PD_I of the second timing controller TCON #2 and an adjacent delay output pin #3 PD_O of the third timing controller TCON #3 may be connected to each other through the second interface line TTL. A repeater REP connected between the second timing controller TCON #2 and the third timing controller TCON #3 may be omitted.

The Vx1 receiver #2 RX may receive the input data enable signal #2 Input DE and image data synchronized therewith through the first interface line Vx1 from the first timing controller TCON #1. The input data enable signal #2 Input DE may be a current-stage input data enable signal which is less delayed than a rear-stage data enable signal #3 Input DE. The Vx1 receiver #2 RX may include a CDR circuit and may perform recovery and image quality compensation processing on the input data enable signal #2 Input DE and the image data synchronized therewith.

The Vx1 transmitter #2 TX may encode the input data enable signal #2 Input DE and the image data synchronized therewith and may transfer an encoded signal to the third timing controller TCON #3 through the first interface line Vx1.

The adjacent delay calculator #2 DCHK may be electrically connected to the adjacent delay input pin PD_I. The adjacent delay calculator #2 DCHK may receive the rear-stage data enable signal #3 Input DE and the current-stage input data enable signal #2 Input DE to calculate and output an adjacent delay amount between the second timing controller TCON #2 and the third timing controller TCON #3.

An input and output delay (I/O Delay between #3 & #2) may be more reflected in the rear-stage data enable signal #3 Input DE. The input and output delay may be accumulated as a feedback process is repeated and may be transferred to a front-stage timing controller, and due to this, the accuracy of delay calculation may be reduced.

In order to offset the input and output delay (I/O Delay between #3 & #2), the second timing controller TCON #2 may further use an I/O delay correction output pin #2 DC_O and an I/O delay correction input pin #2 DC_I. The I/O delay correction output pin #2 DC_O and the I/O delay correction input pin #2 DC_I may be configured for further delaying the current-stage input data enable signal #2 Input DE by the input and output delay amount (I/O Delay between #3 & #2) which is more reflected in the rear-stage data enable signal #3 Input DE. For accurate delay matching, an I/O delay correction output pin #2 DC_O of the second timing controller TCON #2 may be designed to have the same characteristic as that of an adjacent delay output pin #3 PD_O of the third timing controller TCON #3. Also, in the second timing controller TCON #2, the I/O delay correction input pin #2 DC_I may be designed to have the same characteristic as that of the adjacent delay input pin #2 PD_I.

The I/O delay correction output pin #2 DC_O may be connected to an output end of the Vx1 receiver #2 RX. The I/O delay correction output pin #2 DC_O and the I/O delay correction input pin #2 DC_I may be electrically connected to each other through a conductive wire CW outside the second timing controller TCON #2. Accordingly, the current-stage input data enable signal #2 Input DE may pass through the I/O delay correction output pin #2 DC_O, the conductive wire CW, and the I/O delay correction input pin #2 DC_I, and thus, may be input to the adjacent delay calculator #2 DCHK in a state where an input and output delay amount (I/O Delay in #2) is reflected therein.

The conductive wire CW may be patterned on a control printed circuit board (see CPCB of FIG. 2) with the second timing controller TCON #2 mounted thereon. Impedance matching between the conductive wire CW and the second interface line TTL may be made so that the input and output delay amount (I/O Delay in #2) of the second timing controller TCON #2 is the same as an input and output delay amount (I/O Delay between #3 & #2) in which an input and output delay amount (I/O Delay in #3) of the third timing controller TCON #3 of a rear stage is reflected.

The adjacent delay calculator #2 DCHK may calculate a difference between an input of the I/O delay correction input pin #2 DC_I and an input of the adjacent delay input pin #2 PD_I, and thus, may calculate an adjacent delay amount between the second timing controller TCON #2 and the third timing controller TCON #3.

The second timing controller TCON #2 may further use an overall delay input pin #2 OD_I, an overall delay calculator #2 DCON, an overall delay output pin #2 OD_O, and an output controller #2 GEN.

The overall delay input pin #2 OD_I may be configured for receiving a first overall delay amount Overall Delay (#3 & #4) which is generated by the third timing controller TCON #3 and is fed back from the third timing controller TCON #3 through the third interface line SPI. The first overall delay amount Overall Delay (#3 & #4) may be obtained by accumulating adjacent delay amounts up to the fourth timing controller TCON #4 from the third timing controller TCON #3. The fourth timing controller TCON #4 may be a last timing controller, and thus, the first overall delay amount Overall Delay (#3 & #4) may be an adjacent delay amount "C" (see FIG. 11) between the third timing controller TCON #3 and the fourth timing controller TCON #4. In FIG. 11, "XX" may be an internal process processing time of each timing controller and may be equal in all timing controllers.

The overall delay calculator #2 DCON may add an adjacent delay amount "B" (see FIG. 11) between the second timing controller TCON #2 and the third timing controller TCON #3 to a first overall delay amount "C" (see FIG. 11) to calculate a second overall delay amount Overall Delay (#2 & #3 & #4). The second overall delay amount Overall Delay (#2 & #3 & #4) (OD_(B+C) of FIG. 11) may be obtained by accumulating adjacent delay amounts up to the fourth timing controller TCON #4 from the second timing controller TCON #2.

The output controller #2 GEN may delay the current-stage input data enable signal #2 Input DE on the basis of the second overall delay amount Overall Delay (#2 & #3 & #4) to generate an output data enable signal #2 Output DE. The output data enable signal #2 Output DE may be configured for controlling a time at which image data is output to a corresponding display panel. Furthermore, the second overall delay amount Overall Delay (#2 & #3 & #4) may be fed back to the first timing controller TCON #1 through the overall delay output pin #2 OD_O. Then, the first timing controller TCON #1 may calculate an adjacent delay amount "A" (see FIG. 11) between the first timing controller TCON #1 and the second timing controller TCON #2 on the basis of the same scheme and may add the adjacent delay amount "A" (see FIG. 11) to the second overall delay amount Overall Delay (#2 & #3 & #4) to calculate a final overall delay amount Overall Delay (#1 & #2 & #3 & #4) (OD_(A+B+C) of FIG. 11).

Moreover, the last timing controller TCON #4 may be delayed for an internal process processing time XX from the input data enable signal #4 Input DE, and then, may generate an output data enable signal #4 Output DE. Each of the first to third timing controllers TCON #1 to TCON #3 may independently generate an output data enable signal (#1, #2, #3 Output DE) on the basis of an input data enable signal #4 Input DE in which a final delay of the last timing controller TCON #4 is reflected.

Because the output data enable signal (#1, #2, #3 Output DE) is generated based on the final delay of the fourth timing controller TCON #4, the first to fourth timing controllers TCON #1 to TCON #4 may be automatically synchronized therebetween.

Figure 12:
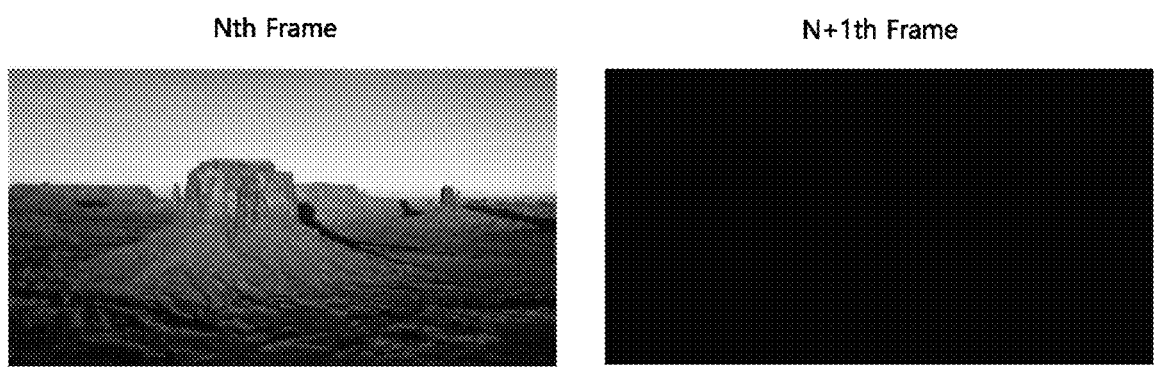
FIG. 12 is a diagram illustrating an example where an input image to be implemented by a display module is changed in two adjacent frames.
Figure 13A:
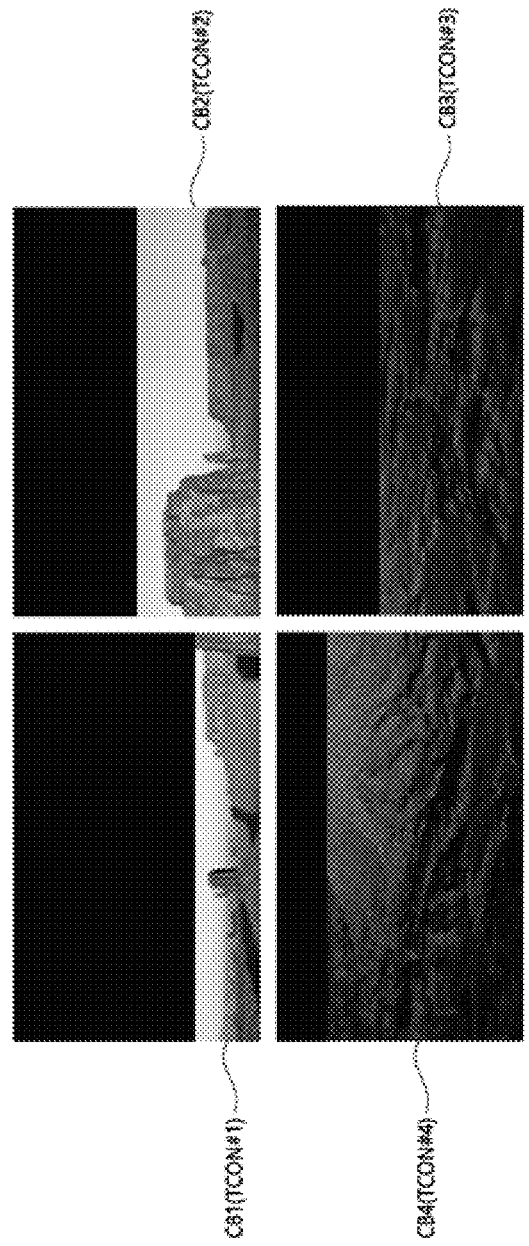
FIG. 13A is a diagram illustrating an example of an image quality defect caused by non-synchronization of an image output between display modules as a comparative example of the present embodiment.
Figure 13B:
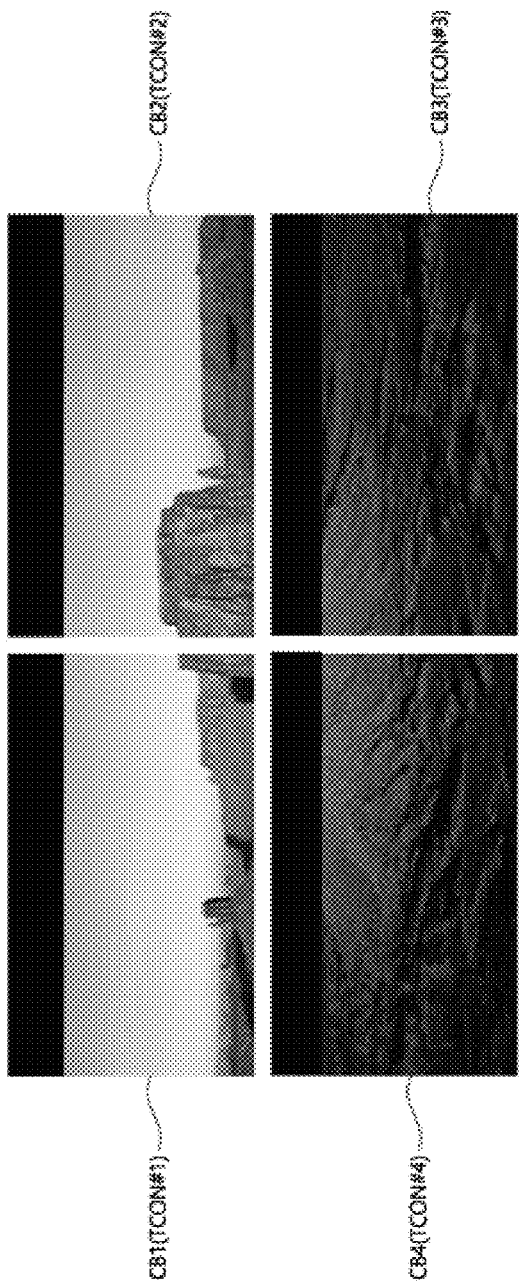
FIG. 13B is a diagram illustrating an example where image quality is improved through synchronization of an image output between display modules in the present embodiment.

FIG. 12 is a diagram illustrating an example where an input image to be implemented by a display module is changed in two adjacent frames. FIG. 13A is a diagram illustrating an example of an image quality defect caused by non-synchronization of an image output between display modules as a comparative example of the present embodiment. FIG. 13B is a diagram illustrating an example where image quality is improved through synchronization of an image output between display modules in the present embodiment.

When image data are rapidly changed in an $N^{th}$ frame and an $N+1^{th}$ frame as shown in FIG. 12, an image quality defect caused by output non-synchronization may be reduced far more in a case (see FIG. 13B), where an output time of image data is matched by a synchronized output data enable signal between display modules sequentially receiving image data on the basis of the cascading scheme, than a case (see FIG. 13A) where the output time is not matched.

A titling display apparatus according to an embodiment of the present disclosure may be described as follows.

A titling display apparatus according to an embodiment of the present disclosure may comprises a plurality of display modules connected to one another to configure a screen; a set board configured to output an input data enable signal and image data synchronized therewith to one of the plurality of display modules; and first to $N^{th}$ (where N is a natural number of 3 or more) timing controllers configured for the plurality of display modules, the first to $N^{th}$ timing controllers are sequentially connected to one another in a first direction through a first interface line based on a cascading scheme and configured to receive the input data enable signal and the image data at different timings which are sequentially delayed and synchronize a display time of the image data on the basis of an independently generated output data enable signal, wherein, by using a current-stage input data enable signal received from an adjacent front-stage timing controller through the first interface line and a rear-stage input data enable signal fed back from an adjacent rear-stage timing controller through a second interface line which differs from the first interface line, at least one of the first to $N^{th}$ timing controllers independently calculates an adjacent delay amount between itself and the rear-stage timing controller so as to generate the output data enable signal.

According to an embodiment of the present disclosure, an $M^{th}$ (where M is a natural number which is more than 1 and less than N) timing controller may comprise: an adjacent delay input pin configured to receive the rear-stage input data enable signal which is received at an M+1$^{th}$ timing controller through the first interface line and is fed back from an adjacent delay output pin of the M+1$^{th}$ timing controller through the second interface line; a receiver configured to receive the current-stage input data enable signal, less delayed than the rear-stage input data enable signal, through the first interface line; and an adjacent delay calculator configured to output an adjacent delay amount between the M$^{th}$ timing controller and the M+1$^{th}$ timing controller on the basis of the current-stage input data enable signal and the rear-stage input data enable signal.

According to an embodiment of the present disclosure, an adjacent delay input pin of the M$^{th}$ timing controller and an adjacent delay output pin of the M+1$^{th}$ timing controller may be connected to each other through the second interface line.

According to an embodiment of the present disclosure, the M$^{th}$ timing controller may further comprise an I/O delay correction output pin and an I/O delay correction input pin for more delaying the current-stage input data enable signal by an input and output delay amount in which the rear-stage input data enable signal is further reflected.

According to an embodiment of the present disclosure, the I/O delay correction output pin and the I/O delay correction input pin may be connected to each other through a conductive wire outside the M$^{th}$ timing controller.

According to an embodiment of the present disclosure, the current-stage input data enable signal may pass through the I/O delay correction output pin, the conductive wire, and the I/O delay correction input pin and be input to the adjacent delay calculator.

According to an embodiment of the present disclosure, the conductive wire may be patterned on a control printed circuit board with the M$^{th}$ timing controller mounted thereon.

According to an embodiment of the present disclosure, impedance matching between the conductive wire and the second interface line may be made so that the input and output delay amount of the M$^{th}$ timing controller is the same as an input and output delay amount in which an input and output delay amount of the M+1$^{th}$ timing controller of a rear stage is reflected.

According to an embodiment of the present disclosure, the M$^{th}$ timing controller may further comprise an overall delay input pin configured to receive a first overall delay amount, which is generated by the M+1$^{th}$ timing controller and is fed back from the M+1$^{th}$ timing controller, through a third interface line which differs from the first interface line, and the first overall delay amount may be obtained by accumulating adjacent delay amounts up to the N$^{th}$ timing controller from the M+1$^{th}$ timing controller.

According to an embodiment of the present disclosure, the M$^{th}$ timing controller may further comprise an overall delay calculator configured to add an adjacent delay amount between the M$^{th}$ timing controller and the M+1$^{th}$ timing controller to the first overall delay amount to generate a second overall delay amount, and the second overall delay amount may be obtained by accumulating adjacent delay amounts up to the N$^{th}$ timing controller from the M$^{th}$ timing controller.

According to an embodiment of the present disclosure, the M$^{th}$ timing controller may further comprise an output controller configured to delay the current-stage input data enable signal on the basis of the second overall delay amount to generate an output data enable signal, and the output data enable signal may be configured for controlling a time, at which the image data is output to a display panel, and is generated by the first to N$^{th}$ timing controllers at the same time.

According to an embodiment of the present disclosure, the M$^{th}$ timing controller may further comprise an adjacent delay output pin configured to feed back the current-stage input data enable signal to an adjacent delay input pin of the M−1$^{th}$ timing controller.

According to an embodiment of the present disclosure, the M$^{th}$ timing controller may further comprise an overall delay output pin configured to feed back a second overall delay amount, generated by the overall delay calculator, to an overall delay input pin of the M−1$^{th}$ timing controller.

According to an embodiment of the present disclosure, each of the first to N$^{th}$ timing controllers may be connected to a plurality of display panels belonging to one of the plurality of display modules.

According to an embodiment of the present disclosure, the timing controller of each display module may be mounted on a control printed circuit board and is connected to panel driving circuits of the display module through a branch cable in parallel.

According to an embodiment of the present disclosure, the first, second and third interface lines may be included in the same transmission cable and are connected between adjacent timing controllers.

According to an embodiment of the present disclosure, the first and second interface lines may be included in the same transmission cable, and the third interface line may be included in a separate transmission cable.

The present embodiment may realize the following effects.

According to the present embodiment, each timing controller may automatically match image output times of all display modules, and thus, an image defect caused by non-synchronization of an image output may be effectively reduced.

Because each timing controller automatically matches image output times of all display modules, the present embodiment may be applied to an expandable and modifiable non-standardization tiling connection structure based on various user needs, and thus, the convenience of users may be considerably enhanced.

The effects according to the present disclosure are not limited to the above examples, and other various effects may be included in the specification.

While the present disclosure has been particularly shown and described with reference to example embodiments, it will be understood by those of ordinary skill in the art that various changes in form and details may be made without departing from the spirit and scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tiling display apparatus, comprising:
   a plurality of display modules connected to one another to configure a screen;
   a set board configured to output an input data enable signal and image data synchronized therewith to one of the plurality of display modules; and
   first to $N^{th}$ timing controllers configured for the plurality of display modules, the first to $N^{th}$ timing controllers are sequentially connected to one another in a first direction through a first interface line based on a cascading scheme and configured to receive the input data enable signal and the image data at different timings which are sequentially delayed and synchronize a display time of the image data on the basis of an independently generated output data enable signal, where N is a natural number of 3 or more,
   wherein, by using a current-stage input data enable signal received from an adjacent front-stage timing controller through the first interface line and a rear-stage input data enable signal fed back from an adjacent rear-stage timing controller through a second interface line which differs from the first interface line, at least one of the first to $N^{th}$ timing controllers independently calculates an adjacent delay amount between itself and the rear-stage timing controller so as to generate the output data enable signal.

2. The tiling display apparatus of claim 1, wherein an $M^{th}$ timing controller comprises:
   an adjacent delay input pin configured to receive the rear-stage input data enable signal which is received at an $M+1^{th}$ timing controller through the first interface line and is fed back from an adjacent delay output pin of the $M+1^{th}$ timing controller through the second interface line;
   a receiver configured to receive the current-stage input data enable signal, less delayed than the rear-stage input data enable signal, through the first interface line; and
   an adjacent delay calculator configured to output an adjacent delay amount between the $M^{th}$ timing controller and the $M+1^{th}$ timing controller on the basis of the current-stage input data enable signal and the rear-stage input data enable signal,
   where M is a natural number which is more than 1 and less than N.

3. The tiling display apparatus of claim 2, wherein an adjacent delay input pin of the $M^{th}$ timing controller and an adjacent delay output pin of the $M+1^{th}$ timing controller are connected to each other through the second interface line.

4. The tiling display apparatus of claim 3, wherein the $M^{th}$ timing controller further comprises an I/O delay correction output pin and an I/O delay correction input pin for more delaying the current-stage input data enable signal by an input and output delay amount in which the rear-stage input data enable signal is further reflected.

5. The tiling display apparatus of claim 4, wherein the I/O delay correction output pin and the I/O delay correction input pin are connected to each other through a conductive wire outside the $M^{th}$ timing controller.

6. The tiling display apparatus of claim 5, wherein the current-stage input data enable signal passes through the I/O delay correction output pin, the conductive wire, and the I/O delay correction input pin and is input to the adjacent delay calculator.

7. The tiling display apparatus of claim 5, wherein the conductive wire is patterned on a control printed circuit board with the $M^{th}$ timing controller mounted thereon.

8. The tiling display apparatus of claim 5, wherein impedance matching between the conductive wire and the second interface line is made so that the input and output delay amount of the $M^{th}$ timing controller is the same as an input and output delay amount in which an input and output delay amount of the $M+1^{th}$ timing controller of a rear stage is reflected.

9. The tiling display apparatus of claim 2, wherein the $M^{th}$ timing controller further comprises an overall delay input pin configured to receive a first overall delay amount, which is generated by the $M+1^{th}$ timing controller and is fed back from the $M+1^{th}$ timing controller, through a third interface line which differs from the first interface line, and
   the first overall delay amount is obtained by accumulating adjacent delay amounts up to the $N^{th}$ timing controller from the $M+1^{th}$ timing controller.

10. The tiling display apparatus of claim 9, wherein the $M^{th}$ timing controller further comprises an overall delay calculator configured to add an adjacent delay amount between the $M^{th}$ timing controller and the $M+1^{th}$ timing controller to the first overall delay amount to generate a second overall delay amount, and
    the second overall delay amount is obtained by accumulating adjacent delay amounts up to the $N^{th}$ timing controller from the $M^{th}$ timing controller.

11. The tiling display apparatus of claim 10, wherein the $M^{th}$ timing controller further comprises an output controller configured to delay the current-stage input data enable signal on the basis of the second overall delay amount to generate an output data enable signal, and
    the output data enable signal is configured for controlling a time, at which the image data is output to a display panel, and is generated by the first to $N^{th}$ timing controllers at the same time.

12. The tiling display apparatus of claim 10, wherein the $M^{th}$ timing controller further comprises an overall delay output pin configured to feed back a second overall delay amount, generated by the overall delay calculator, to an overall delay input pin of the $M-1^{th}$ timing controller.

13. The tiling display apparatus of claim 9, wherein the first, second and third interface lines are included in the same transmission cable and are connected between adjacent timing controllers.

14. The tiling display apparatus of claim 9, wherein the first and second interface lines are included in the same transmission cable, and the third interface line is included in a separate transmission cable.

15. The tiling display apparatus of claim 2, wherein the $M^{th}$ timing controller further comprises an adjacent delay output pin configured to feed back the current-stage input data enable signal to an adjacent delay input pin of the $M-1^{th}$ timing controller.

16. The tiling display apparatus of claim 1, wherein each of the first to $N^{th}$ timing controllers is connected to a plurality of display panels belonging to one of the plurality of display modules.

17. The tiling display apparatus of claim 1, wherein the timing controller of each display module is mounted on a control printed circuit board and is connected to panel driving circuits of the display module through a branch cable in parallel.

* * * * *